US012787089B2

(12) United States Patent
Liu et al.

(10) Patent No.: US 12,787,089 B2
(45) Date of Patent: Nov. 3, 2026

(54) SYSTEMS AND METHODS FOR ESTABLISHING SHARED N3 TUNNEL

(71) Applicant: ZTE CORPORATION, Shenzhen (CN)

(72) Inventors: Yansheng Liu, Shenzhen (CN); Zijiang Ma, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 330 days.

(21) Appl. No.: 18/517,472

(22) Filed: Nov. 22, 2023

(65) Prior Publication Data

US 2024/0188157 A1 Jun. 6, 2024

Related U.S. Application Data

(63) Continuation of application No. PCT/CN2021/112212, filed on Aug. 12, 2021.

(51) Int. Cl.
*H04W 76/15* (2018.01)
*H04L 5/00* (2006.01)
*H04W 76/30* (2018.01)
*H04W 76/40* (2018.01)

(52) U.S. Cl.
CPC ........... *H04W 76/15* (2018.02); *H04L 5/0053* (2013.01); *H04W 76/30* (2018.02); *H04W 76/40* (2018.02)

(58) Field of Classification Search
CPC .... H04L 5/0053; H04W 76/15; H04W 76/30; H04W 76/40
See application file for complete search history.

(56) References Cited

U.S. PATENT DOCUMENTS

| | | | | |
|---|---|---|---|---|
| 2019/0069333 A1* | 2/2019 | Kim | .................. | H04W 36/0033 |
| 2019/0297652 A1 | 9/2019 | Yang et al. | | |
| 2021/0152515 A1* | 5/2021 | Akl | ........................ | H04W 40/22 |
| 2022/0132626 A1* | 4/2022 | Xu | ........................ | H04W 76/11 |
| 2023/0108178 A1* | 4/2023 | Xu | ........................ | H04W 76/40 370/312 |
| 2023/0284244 A1* | 9/2023 | Xu | ........................ | H04W 72/51 370/312 |

FOREIGN PATENT DOCUMENTS

| | | |
|---|---|---|
| CN | 112866929 A | 5/2021 |
| WO | WO-2021/109428 A1 | 6/2021 |
| WO | WO-2021/109493 A1 | 6/2021 |

OTHER PUBLICATIONS

Ericsson, "On Support of mobility between gNBs supporting MBS" 3GPP TSG-RAN WG3 Meeting #112-e, R3-212105, May 27, 2021, Online (4 pages).

(Continued)

*Primary Examiner* — Brian P Cox
(74) *Attorney, Agent, or Firm* — Foley & Lardner LLP

(57) ABSTRACT

Embodiments of a system, device and method for establishing a shared N3 tunnel are disclosed. In some aspects, a wireless communication method includes: receiving, by a network node from a first one of a plurality of wireless communication nodes, a first message related to a tunnel configured to be shared by the plurality of wireless communication nodes. In some embodiments, the plurality of wireless communication nodes share a same Centralized Unit-User Plane (CU-UP).

16 Claims, 8 Drawing Sheets

(56) References Cited

OTHER PUBLICATIONS

International Search Report and Written Opinion for PCT Appl. No. PCT/CN2021/112212, mailed May 7, 2022 (8 pages).
Nokia et al., "MBS Mobility: NG User Plane Setup (Stage 3)" 3GPP TSG-RAN WG3#111-e, R3-210169, Feb. 4, 2021, E-Meeting (8 pages).
ZXTE, "Discussion on MBS establishment and mobility in case of common gNB-CU-UP deployment" 3GPP TSG-RAN WG3 #113-e, R3-213790, Aug. 26, 2021, Online (4 pages).
Extended European Search Report for EP Appl. No. 21953136.5, dated Aug. 22, 2024 (10 pages).

* cited by examiner

SYSTEMS AND METHODS FOR ESTABLISHING SHARED N3 TUNNEL

CROSS-REFERENCE TO RELATED APPLICATION

This application claims the benefit of priority under 35 U.S.C. § 120 as a continuation of International Patent Application No. PCT/CN2021/112212, filed on Aug. 12, 2021, the disclosure of which is incorporated herein by reference in its entirety.

TECHNICAL FIELD

The disclosure relates generally to wireless communications and, more particularly, to systems and methods for establishing a shared N3 tunnel.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Embodiments of a system, device and method for establishing a shared N3 tunnel are disclosed. In some aspects, a wireless communication method includes: receiving, by a network node from a first one of a plurality of wireless communication nodes, a first message related to a tunnel configured to be shared by the plurality of wireless communication nodes. In some embodiments, the plurality of wireless communication nodes share a same Centralized Unit-User Plane (CU-UP).

In some aspects, the plurality of wireless communication nodes are associated with a Union Random Access Node Identification (Union RAN ID), the method further includes receiving, by the network node from the first wireless communication node, the first message comprising at least one of the Union RAN ID, an RAN ID of the first wireless communication node, or information corresponding to a Multicast and Broadcast Services (MBS) session, and determining, by the network node, whether the tunnel satisfies the information corresponding to the MBS session.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
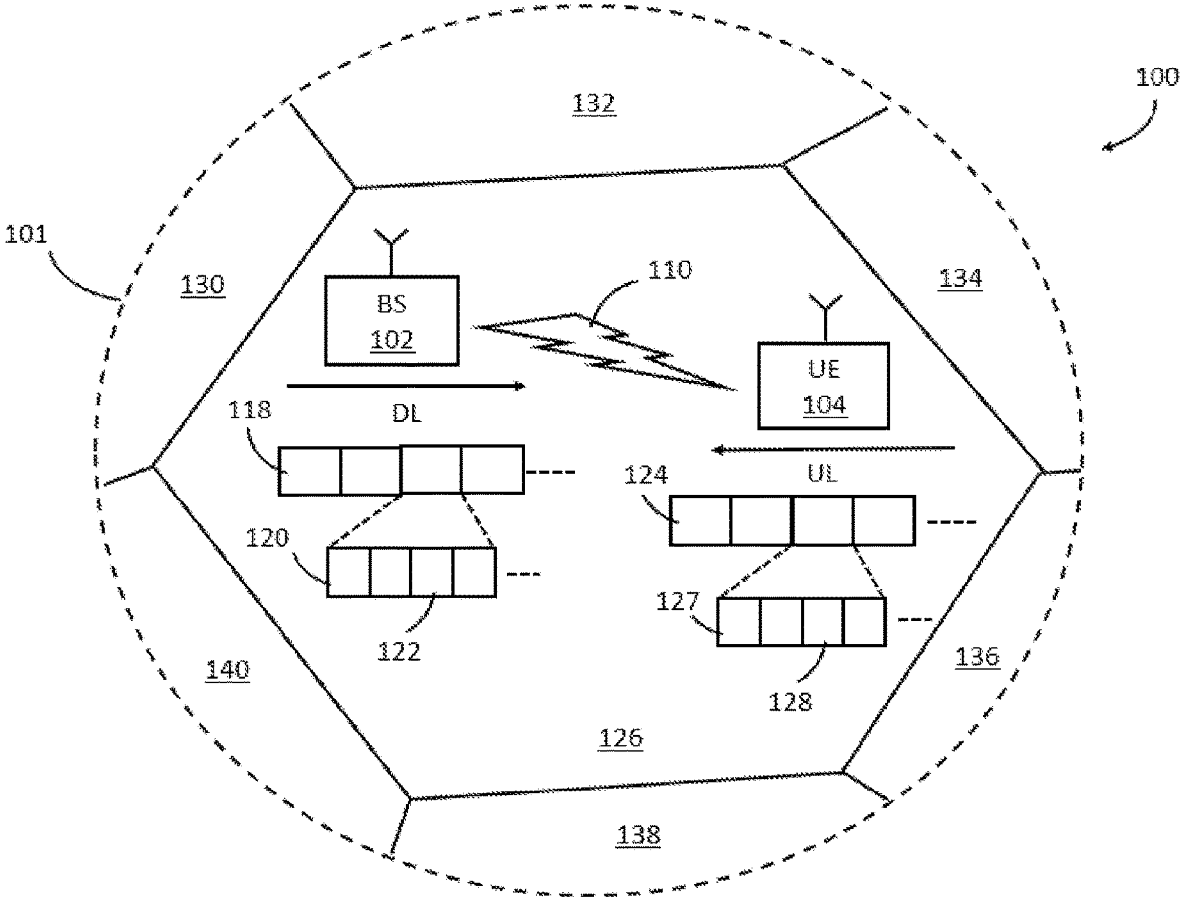
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IOT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
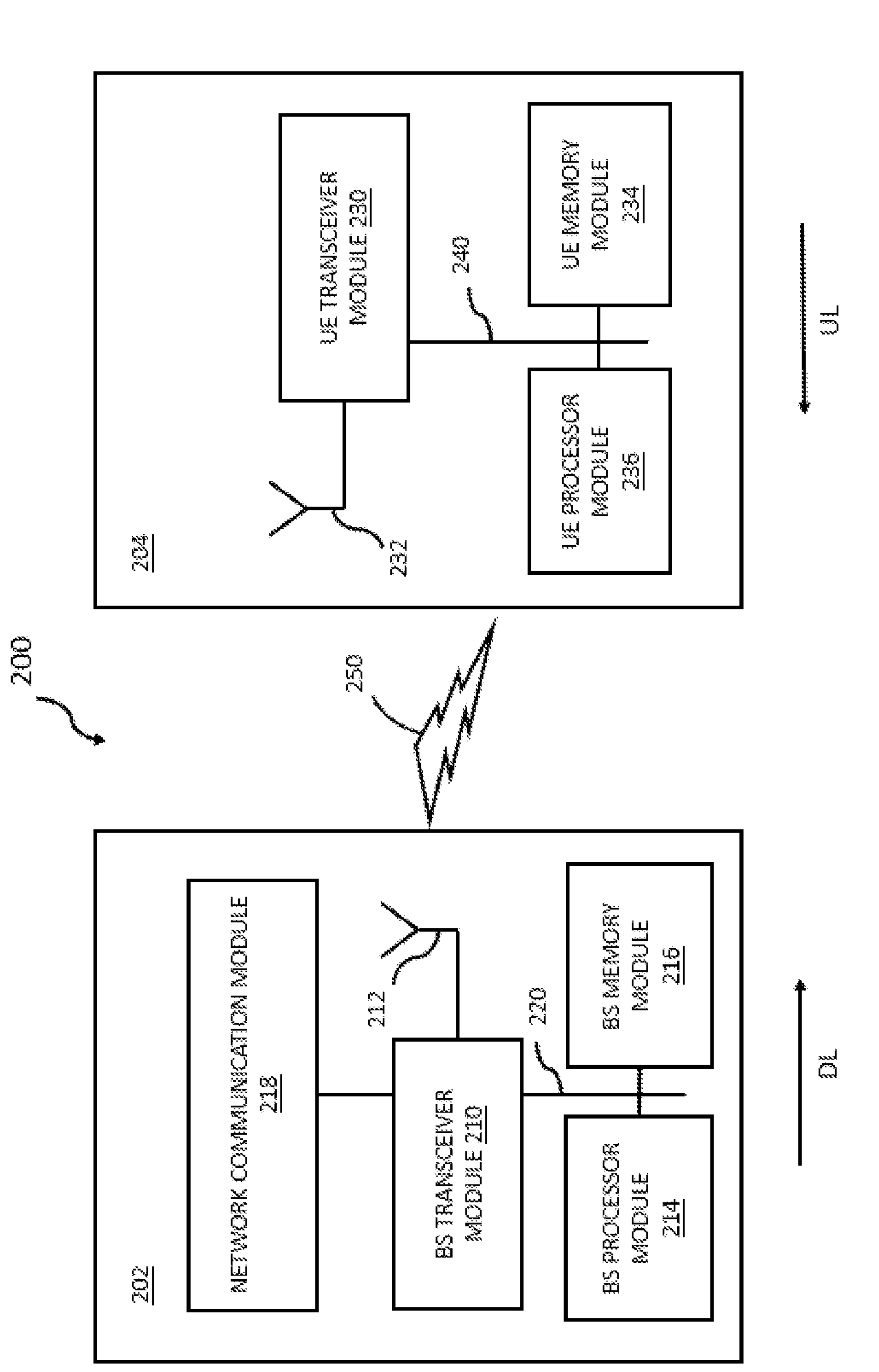
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Establishing a Shared N3 Tunnel

Figure 3A:
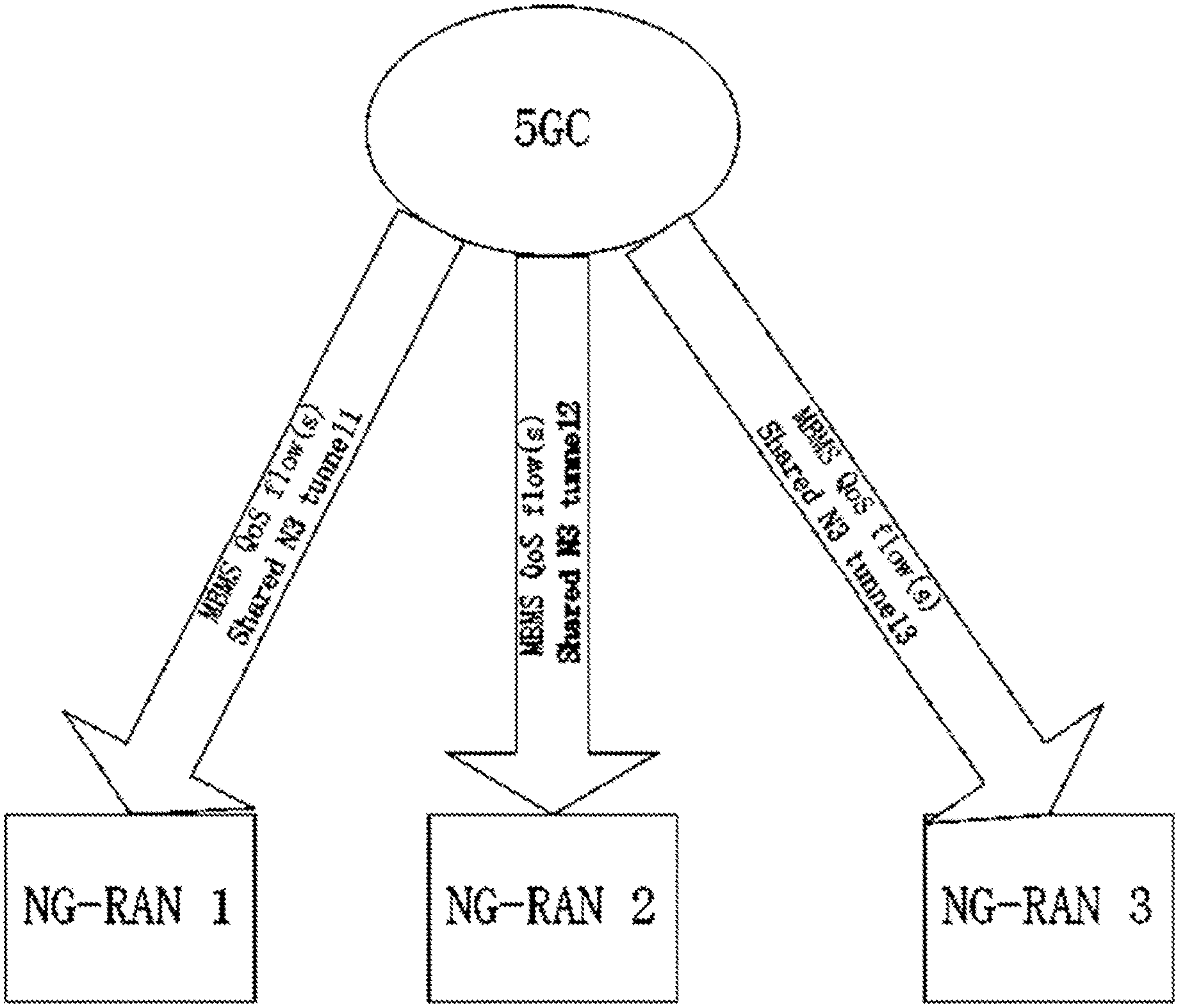
FIGS. 3A-3B illustrate block diagrams of a network structure, in accordance with some embodiments.
Figure 3B:
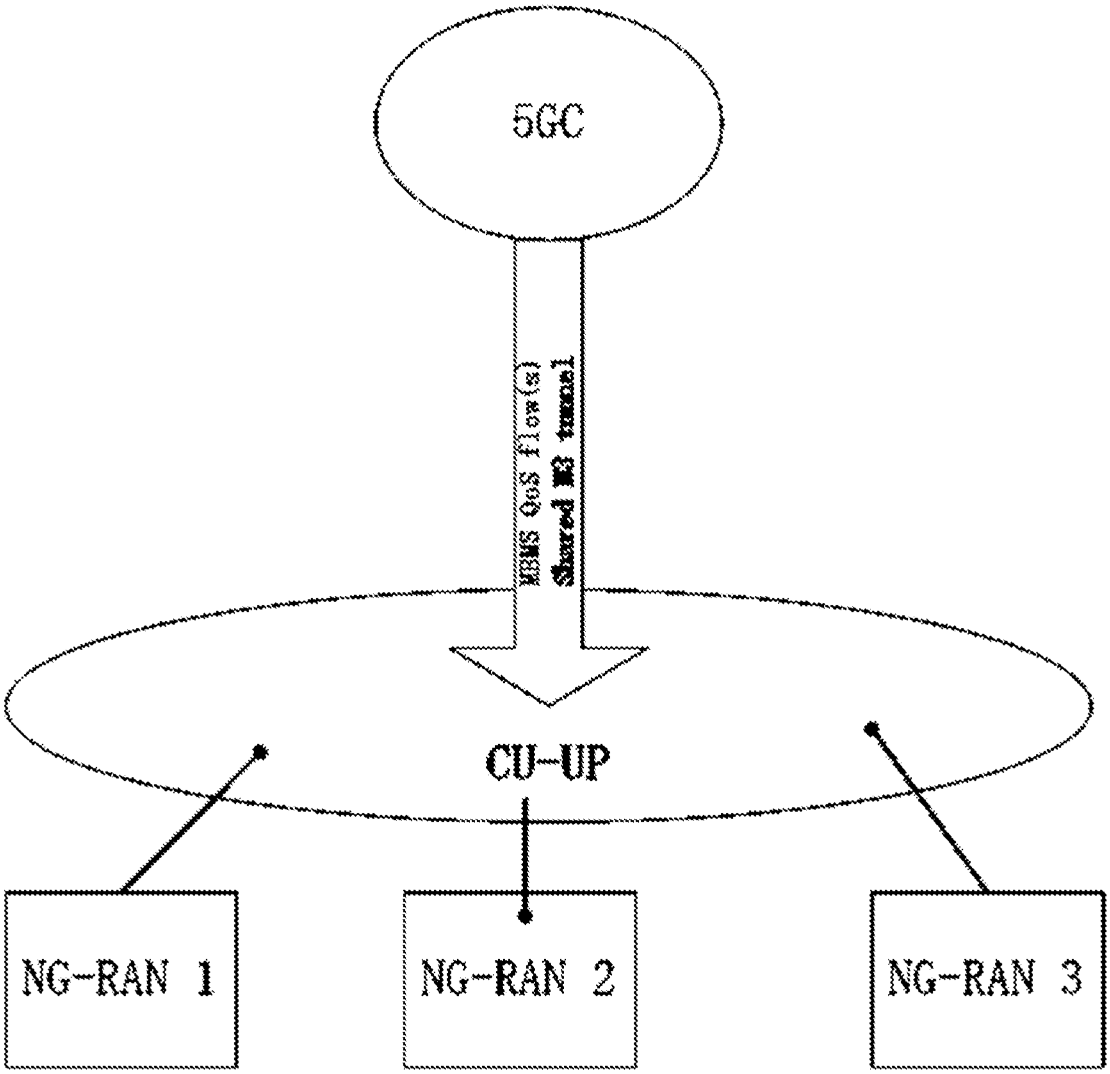

FIGS. 3A-3B illustrate network structures, in accordance with some embodiments. A common network structure is shown in in FIG. 3A. Different Next Generation Random Access Network (NG-RAN) nodes do not share Centralized Unit-User Plane (CU-UP) with others. For a special network structure which is shown in FIG. 3B, one CU-UP can be used by multiple NG-RAN nodes. Hence, it is possible that one shared N3 tunnel for Multicast and Broadcast Services (MBS) data transmission can be used by all involved NG-RAN nodes in this special case. However, no mechanism is defined to let the NG-RAN nodes which share the same CU-UP know whether the shared N3 tunnel for a MBS session has been established in the shared CU-UP. Disclosed herein are embodiments of a mechanism to solve this technical problem.

In some embodiments, in normal 5G network deployment (FIG. 3A), for a certain Multimedia Broadcast/Multicast Service (MBMS, also known as Multicast and Broadcast Services (MBS)) service including one or MBMS Quality of Service (QOS) flow, User Plane Function (UPF), which is one of the 5G core network (5GC) entities, will establish one N3 tunnel with each NG-RAN node. In some embodiments, a RAN node (e.g., a NG-RAN node) covers a geographical area which is divided into cell areas, with each cell area being served by a base station (BS, e.g., the BS 102, the BS 202, a next generation NodeB (gNB), an evolved NodeB (eNB), a wireless communication node, a cell tower, a 3GPP radio access device, a non-3GPP radio access device, etc.). In some embodiments, a user equipment (UE, e.g., the UE 104, the UE 204, a mobile device, a wireless communication device, a terminal, etc.) camps on a cell belonged to one NG-RAN, when network allows the UE to join an MBMS service including one or more MBMS QoS flows. In the NG-RAN node, if the MBMS service is always established, e.g., the multicast/shared N3 tunnel (used to transmit the user data of the MBMS service) is already established, 5GC does not need to re-establish the shared N3 tunnel for this UE. But, in some embodiments, if MBMS service is not established, i.e., the multicast/shared N3 tunnel is not established, then 5GC establishes the multicast/shared tunnel between 5GC and NG-RAN to transmit MBMS user data from the UPF to the NG-RAN.

In a special 5G network deployment (FIG. 3B), some NG-RAN nodes share the union user plane resources (e.g., a common user plane resource pool), and only one N3 tunnel is needed between UPF and some NG-RAN nodes. If the 5GC has acknowledged that the multicast/shared N3 tunnel for a certain MBMS service has already been established in a certain NG-RAN node, e.g., NG-RAN1 or NG-RAN node 1, and a neighboring NG-RAN node, e.g., NG-RAN2 or NG-RAN node 2, has the union user plane resource pool with NG-RAN1, then 5GC does not need to re-establish the shared N3 tunnel.

Currently, for the established multicast/shared N3 tunnel in between UPF and NG-RAN node 1, the 5GC has no idea whether its neighbor NG-RAN node(s) can share the union user plane resource pool with the NG-RAN node 1, so that 5GC has to establish another shared N3 tunnel for the same MBMS service in the neighbor NG-RAN node(s).

In this current case, when a UE moves from NG-RAN node 1 to its neighbor NG-RAN node, the UE has to receive MBMS user data from the shared N3 tunnel 1 to another shared N3 tunnel (e.g., tunnel 2). What is needed are embodiments of a mechanism to determine whether the neighbor NG-RAN node(s) can share the union user plane resource pool with the NG-RAN node 1.

Some embodiments of an New Generation Application Protocol (NG-AP) enhancement are introduced to solve the MBS shared N3 tunnel establishment, release, and UE handover for the shared CU-UP case. In addition, some embodiments, of an E1 Application Protocol (E1AP) are introduced.

Figure 4:
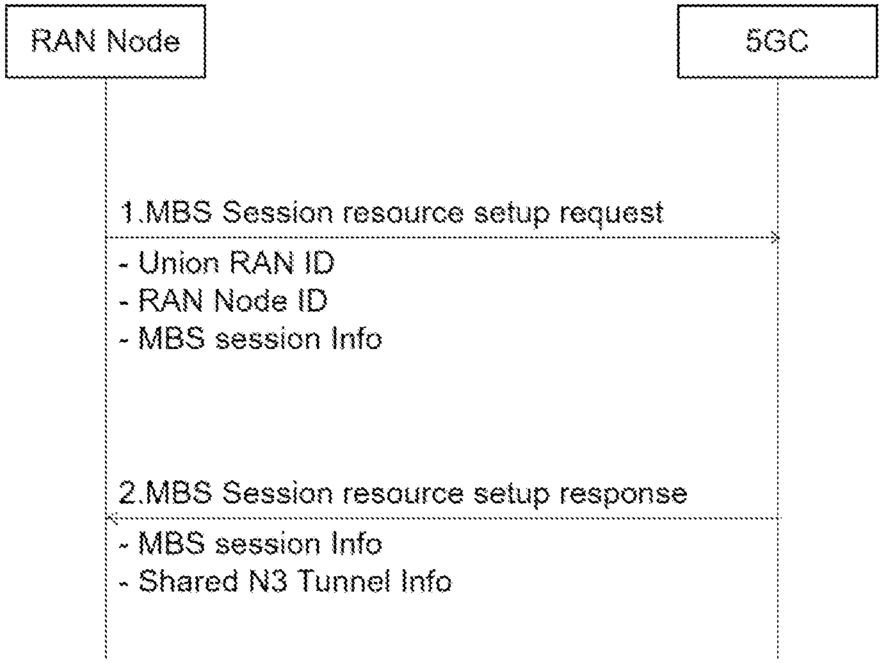
FIG. 4 illustrates a swim lane diagram for establishing a Shared N3 Tunnel, in the case of a RAN Node storing a Union RAN ID, in accordance with some embodiments.

FIG. 4 illustrates a swim lane diagram for establishing a Shared N3 Tunnel, in the case of a RAN Node storing a Union RAN ID, in accordance with some embodiments. In some embodiments, a Union RAN identifier/identification (ID) is defined for the shared CU-UP case. In some embodiments, each RAN node in the Union RAN keeps/stores/tracks the Union RAN ID. A RAN node may add the Union RAN ID into the MBS session resource setup request for shared N3 tunnel establishment if the RAN node is going to re-use the existing Shared N3 Tunnel. In some embodiments, if it is the first time the 5GC receives the request in the Union RAN, the 5GC links the Union RAN ID with the newly established shared N3 tunnel for the MBS session. In some embodiments, whenever another RAN node in the group sends the MBS session resource setup request with a Union RAN ID to the 5GC, the 5GC first checks whether existing Shared N3 Tunnel satisfies the requirement. In some embodiments, the 5GC configures the existing Shared N3 tunnel parameters to the RAN node. Then, if RAN node decides to use the existing shared N3 tunnel for this MBS session, it can transmit the received parameters to the shared CU-UP via E1AP with re-use indication.

RAN node is not forced to use the existing Shared N3 Tunnel in the Union RAN. If a RAN node in a union RAN and does not use/decide to use/want to use the existed Shared N3 Tunnel, the RAN node in the union RAN can transmit the common MBS Session Resource Setup Request message excluding the Union RAN ID to the 5GC. Then, in some embodiments, the common MBS Session Resource Setup Request/Response procedure is performed. In some embodiments, after the common setup procedure, a Shared N3 tunnel which does not belong to the Union RAN is established between the RAN node and 5GC.

As shown in FIG. 4, before step 1, a RAN node in a union RAN decides to use existing Shared N3 Tunnel if possible. At step 1, the RAN node transmits a NG message (e.g., an MBS Session Resource Setup Request) to the 5GC. The message may contain one or more of a Union RAN ID, a RAN Node ID, or MBS Session Info.

At step 2, after the 5GC receives the message from the RAN node side, the 5GC determines whether a Shared N3 Tunnel that is associated with the Union RAN ID satisfies/fulfills/meets the MBS Session information requirement. In some embodiments, if the Shared N3 Tunnel satisfies the MBS Session information requirement, the 5GC adds the received RAN Node ID into the RAN List associated with the MBS Session and/or the Shared N3 Tunnel. In some embodiments, if the Shared N3 Tunnel does not satisfy the MBS Session information requirement (e.g., no available existing Shared N3 Tunnel), the 5GC establishes a new Shared N3 tunnel for the MBS Session.

In some embodiments, a RAN List that is used to record which RAN node is using the Shared N3 tunnel and the Union RAN ID for the Union RAN is also linked to the MBS Session and the Shared N3 Tunnel. The replied NG message (e.g., MBS Session Resource Setup Response) includes one or more of the MBS Session Info or the Shared N3 Tunnel Info.

Figure 5:
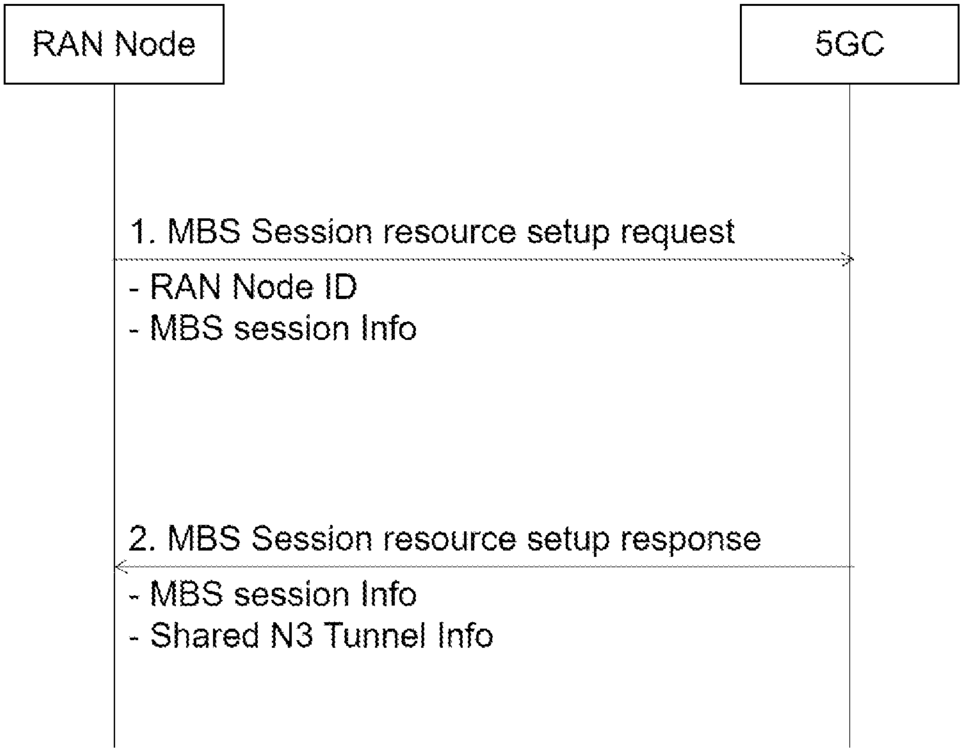
FIG. 5 illustrates a swim lane diagram for establishing a Shared N3 Tunnel, in the case of a 5GC storing a Union RAN ID, in accordance with some embodiments.

FIG. 5 illustrates a swim lane diagram for establishing a Shared N3 Tunnel, in the case of a 5GC storing a Union RAN ID, in accordance with some embodiments. The 5GC can store a list (e.g., a RAN stack) that includes RAN Node IDs that share the same CU-UP. The ID may be one of a global RAN Node ID or a newly defined specific RAN Node ID (e.g., local, unique, shorter than the global RAN Node ID). In some embodiments, the MBS session resource setup request message transmits from the RAN Node in the RAN stack (e.g., RAN_Node_1) to the 5GC with its RAN Node ID. When the 5GC receives the request message, the 5GC can link the RAN stack to the MBS session (e.g., store the RAN stack into the MBS session context) and the Shared N3 Tunnel. Hence, if another RAN Node in this RAN stack (e.g., RAN_Node_2) sends the request message with its ID to the 5GC, 5GC can determine whether a satisfactory shared N3 tunnel has already been setup to the Union RAN. In some embodiments, if a satisfactory shared N3 tunnel has already been setup to the Union RAN, 5GC replies to the request by sending the existing shared N3 tunnel info to the RAN_Node_2 instead of setting up a new tunnel.

The RAN node is not forced to use the shared N3 tunnel with other RAN nodes in the Union RAN. In some embodiments, if a RAN node (a) does not transmit the new defined RAN Node ID, (b) transmits the global RAN node ID with an indication, or (c) does not transmit the global RAN node ID to the 5GC, the 5GC configures a common shared N3 tunnel to the RAN node. In some embodiments, the shared N3 tunnel is not linked to the RAN stack.

As shown in FIG. 5, before step 1, a RAN node in a union RAN decides to use existing Shared N3 Tunnel. At step 1, the RAN node transmits the MBS Session Resource Setup Request message to the 5GC. The message may contain one or more of the RAN Node ID or the MBS Session Information At step 2, after the 5GC receives the message from RAN node side, the determines whether a Shared N3 Tunnel that is associated with the related RAN stack satisfies the MBS Session information requirement. In some embodiments, if the Shared N3 Tunnel satisfies the MBS Session information requirement, the 5GC adds the RAN Node ID to the RAN List associated with the existing shared N3 tunnel. In some embodiments, if the Shared N3 Tunnel does not satisfy the MBS Session information requirement, (e.g., no available existing Shared N3 Tunnel), the 5GC establishes a new Shared N3 tunnel for the MBS Session. In some embodiments, after establishment, the 5GC links the RAN stack of the Union RAN to the newly established shared N3 tunnel and/or the MBS session.

In some embodiments, a RAN List (not the RAN stack) that is used to record which RAN node is using the Shared N3 tunnel for the Union RAN is also linked to the MBS Session and the Shared N3 Tunnel. In some embodiments, the MBS Session Resource Setup Response message includes one or more of the MBS Session Info or the Shared N3 Tunnel Info. In some embodiments, after the 5GC establishes one shared N3 tunnel, a RAN List (e.g., that contains which RAN Node is using the shared N3 tunnel) is also maintained by the 5GC and is linked to the MBS session and shared N3 tunnel. When the 5GC receives new setup request for the same MBS session with the same requirements from the same Union RAN, the 5GC may send the parameters of existing shared N3 tunnel to the new RAN Node and append the RAN Node ID into the RAN List.

Figure 6:
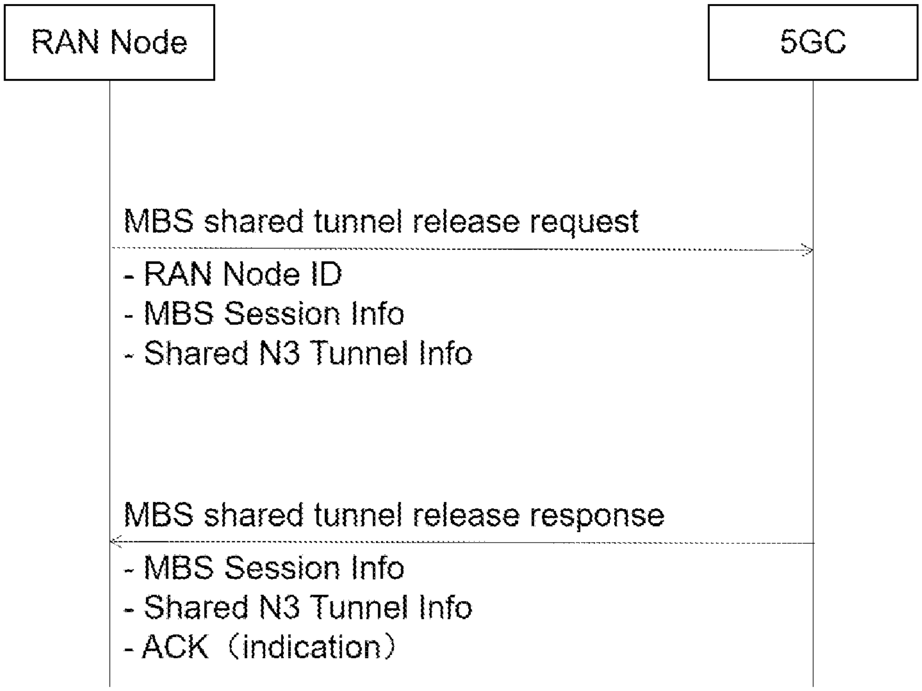
FIG. 6 illustrates a swim lane diagram for releasing a Shared N3 Tunnel, in accordance with some embodiments. Before Step 1, if no camped UE is using the MBS, the RAN Node triggers the MBS Shared Tunnel Release procedure.

FIG. 6 illustrates a swim lane diagram for releasing a Shared N3 Tunnel, in accordance with some embodiments. Before Step 1, if no camped UE is using the MBS, the RAN Node triggers the MBS Shared Tunnel Release procedure. At step 1, the RAN Node transmits the MBS Shared Tunnel Release Request message to the 5GC. The message may contain one or more of the RAN Node ID, the MBS Session Info, or the Shared N3 Tunnel Info At step 2, when the 5GC detects the RAN Node ID in the received message, the 5GC deletes the RAN ID in the RAN ID List and replies with the MBS Shared Tunnel Release Response message to the RAN Node. The message may contain one or more of the MBS Session ID, the Shared N3 Tunnel Info, or the ACK(indication).

In some embodiments, if the RAN List is empty, the common tunnel release procedure is triggered by 5GC and the shared N3 tunnel is released. In some embodiments, if the RAN List is empty, then it is indicated that there is no RAN node using the related shared N3 tunnel. Hence, in some embodiments, when the 5GC receives the shared N3 tunnel release request message, the 5GC replies with the shared N3 tunnel release respond message to the last NG-RAN node and releases the shared N3 tunnel. In some embodiments, the release procedure happens only between the last NG-RAN nodes that transmit the shared N3 tunnel release procedure.

Figure 7:
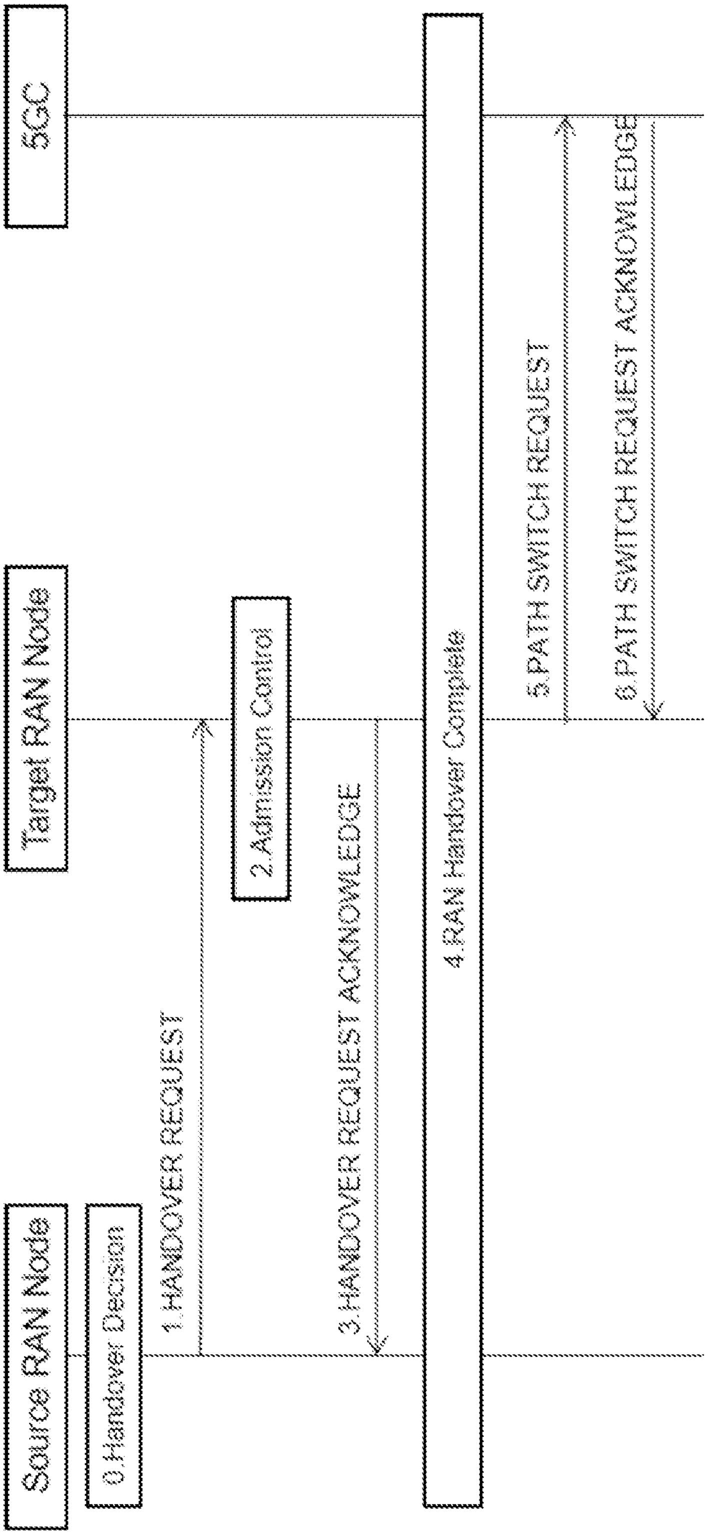
FIG. 7 illustrates a swim lane diagram for an NG-AP-based Shared Tunnel during Handover, in accordance with some embodiments.

FIG. 7 illustrates a swim lane diagram for an NG-AP-based Shared Tunnel during Handover, in accordance with some embodiments. At step 0, the Source RAN Node decides to trigger the Handover. At step 1, the Source RAN Node transmits the Handover Request message to the Target RAN Node. For the MBS purpose, the message may contain one or more of the MBS Session Info, the Shared N3 Tunnel Info, or the Union RAN ID (see FIG. 4 for details).

At step 2, the Target RAN Node performs the admission control. At step 3, the Target RAN Node transmits the Handover Request Acknowledge message to the Source RAN Node. At step 4, other necessary procedures for Handover and the handover completes.

In some embodiments, the Target RAN Node knows the shared N3 tunnel can be re-used before sending PATH SWITCH REQUEST message. In some embodiments, at step 5, the Target Node transmits the Path Switch Request message to the 5GC. The message may contain one or more of Union RAN ID (e.g., for embodiments with respect to FIG. 4), the RAN Node ID, the Shared N3 Tunnel Info, or the Re-use tunnel indication.

In some embodiments, at step 6, after 5GC receives the above info in the message, the 5GC records/adds the Target RAN Node ID into the RAN List associated with the Shared N3 Tunnel and the MBS Session. Then, in some embodiments, the 5GC replies with the Path Switch Request Acknowledge message. The message may contain one or more of the MBS Session Info, the Shared N3 Tunnel Info, or the Re-use Indication ACK. In some embodiments, the source node triggers the procedure with respect to FIG. 6 accordingly after the handover. In some embodiments, the target node triggers the procedure in FIG. 4 or FIG. 5 accordingly after the handover.

In some embodiments, the Target RAN Node that belongs to different Union RAN does not know there is an available Shared N3 Tunnel. In some embodiments, at step 5, the Target Node transmits the Path Switch Request message to the 5GC. The message may contain one or more of Union RAN ID (e.g., for embodiments with respect to FIG. 4), the RAN Node ID, or the Shared N3 Tunnel Info.

In some embodiments, at step 6, after the 5GC receives the above info in the message, the 5GC records the Target RAN Node ID into the RAN List associated with the Shared N3 Tunnel and the MBS Session. Then, in some embodiments, the 5GC replies with the Path Switch Request Acknowledge message. The message may contain one or more of the MBS Session Info or the Shared N3 Tunnel Info.

In some embodiments, the source node triggers the procedure with respect to FIG. 6 accordingly after the handover. In some embodiments, the target node triggers the procedure in FIG. 4 or FIG. 5 accordingly after the handover.

In some embodiments, no available shared N3 tunnel can be used by the target RAN Node. In some embodiments, at step 5, the Target Node transmits the Path Switch Request message to the 5GC. The message may contain one or more of Union RAN ID (e.g., for embodiments with respect to FIG. 4), the RAN Node ID or the Shared N3 Tunnel Info.

In some embodiments, at step 6, after the 5GC receives the message, considering there is no available Shared N3 Tunnel for the target RAN Node, the 5GC establishes a new Shared N3 tunnel for the MBS Session received in the Path Switch message.

In some embodiments, the source node triggers the procedure with respect to FIG. 6 accordingly after the handover. In some embodiments, the target node triggers the procedure in FIG. 4 or FIG. 5 accordingly after the handover.

Figure 8:
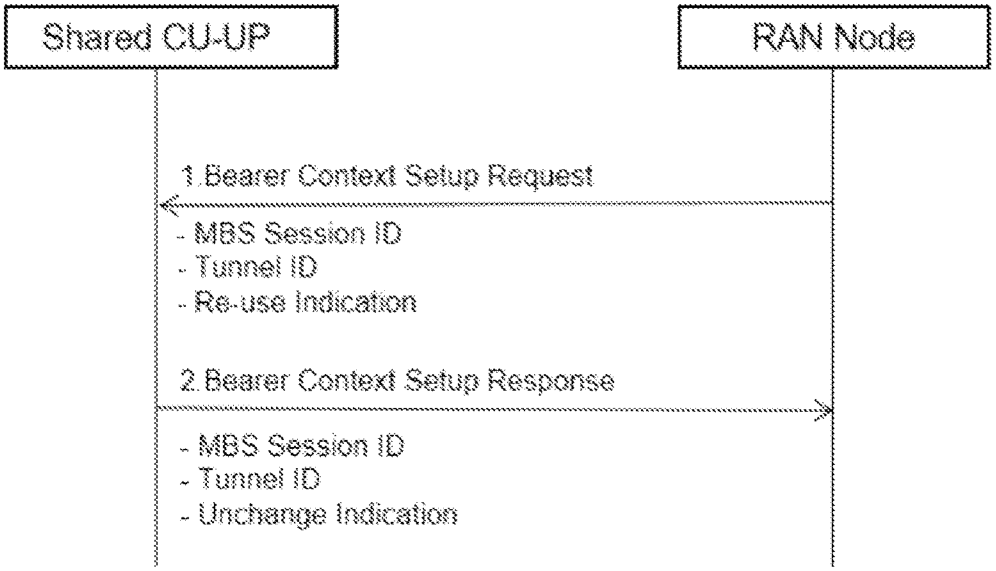
FIG. 8 illustrates a swim lane diagram for performing E1AP Procedure for re-using Shared N3 Tunnel, in accordance with some embodiments.

FIG. 8 illustrates a swim lane diagram for performing E1AP Procedure for re-using Shared N3 Tunnel, in accordance with some embodiments. Some embodiments may be used for a configuration transmission between a shared CU-UP and a centralized unit control plane (CU-CP) (RAN Node) for re-using the existing shared N3 tunnel in the embodiments according to FIGS. 4-7.

At step 1, after the RAN node knows that it can re-use the existing shared N3 tunnel, the RAN Node transmits an E1 message (e.g., Bearer Context Setup Request) to the shared CU-UP in the Union RAN. The message may contain one or more of the MBS Session ID, the Tunnel ID, or a Re-use Indication.

At step 2, the Shared CU-UP receives the message and re-uses the existing shared N3 tunnel for the RAN Node. Then the Shared CU-UP sends a message that is a reply to the E1 message (e.g., Bearer Context Setup Response) to RAN Node. The message may contain one or more of the MBS Session ID, the Tunnel ID, or an Unchanged Indication.

Figure 9:
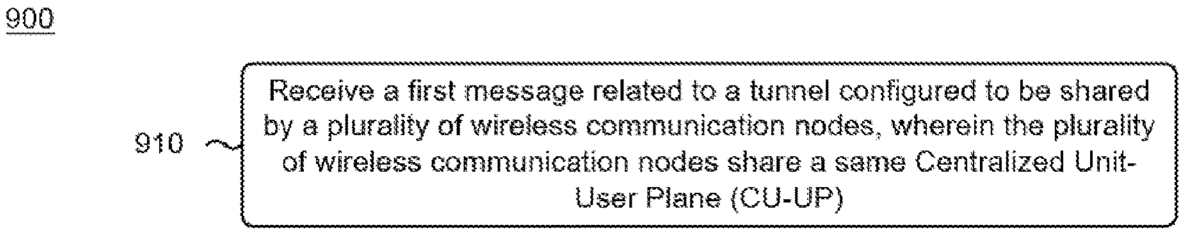
FIG. 9 illustrates a method of receiving a message related to a shared tunnel, in accordance with some embodiments.

FIG. 9 illustrates a method 900 of establishing a shared N3 tunnel, in accordance with some embodiments. Referring to FIGS. 1-8, the method 900 can be performed by a wireless communication device (e.g., a UE), a wireless communication node (e.g., base station, a gNB), and/or a network node (e.g., a 5GC) in some embodiments. Additional, fewer, or different operations may be performed in the method 900 depending on the embodiment.

At operation 910, in some embodiments, a network node from a first one of a plurality of wireless communication nodes receives a first message related to a tunnel configured to be shared by the plurality of wireless communication nodes. In some embodiments, the plurality of wireless communication nodes share a same Centralized Unit-User Plane (CU-UP). In some embodiments, the network node from a first one of a plurality of wireless communication nodes is a 5GC. In some embodiments, the first one of a plurality of wireless communication nodes is a RAN node (e.g., an NG-RAN node).

In some aspects, the plurality of wireless communication nodes are associated with a Union Random Access Node Identification (Union RAN ID), the method further comprises: receiving, by the network node from the first wireless communication node, the first message comprising at least one of the Union RAN ID, an RAN ID of the first wireless communication node, or information corresponding to a Multicast and Broadcast Services (MBS) session, and determining, by the network node, whether the tunnel satisfies the information corresponding to the MBS session.

In some aspects, the method includes in response to determining that the tunnel satisfies the information corresponding to the MBS session, adding, by the network node, the RAN ID of the first wireless communication node into an RAN list associated with the MBS session or the tunnel, and transmitting, by the network node to the first wireless communication node, a second message including at least one of the information corresponding to the MBS session or information corresponding to the tunnel.

In some aspects, the method includes in response to determining that the tunnel does not satisfy the information corresponding to the MBS session, establishing, by the network node, the tunnel for the MBS session, and transmitting, by the network node to the first wireless communication node, a second message including at least one of the information corresponding to the MBS session or information corresponding to the tunnel.

In some aspects, the wireless communication node maintains an RAN list that includes a global RAN ID shared by the plurality of wireless communication nodes, or a plurality of specific RAN IDs respectively associated with the plurality of wireless communication nodes.

In some aspects, the method includes receiving, by the network node from the first wireless communication node, the first message including at least one of the specific RAN ID of the first wireless communication node, or information corresponding to a Multicast and Broadcast Services (MBS) session, and determining, by the network node, whether the tunnel satisfies the information corresponding to the MBS session.

In some aspects, the method includes in response to determining that the tunnel satisfies the information corresponding to the MBS session, adding, by the network node, the specific RAN ID of the first wireless communication node into the RAN list, and transmitting, by the network node to the first wireless communication node, a second message including at least one of the information corresponding to the MBS session or information corresponding to the tunnel.

In some aspects, the method includes in response to determining that the tunnel does not satisfy the information corresponding to the MBS session, establishing, by the network node, the tunnel for the MBS session, and transmitting, by the network node to the first wireless communication node, a second message including at least one of the information corresponding to the MBS session or information corresponding to the tunnel.

In some aspects, the method includes adding, by the network node, the specific RAN ID of the first wireless communication node into the RAN list.

In some aspects, the method includes receiving, by the network node from the first wireless communication node, the first message including at least one of an RAN ID of the first wireless communication node, information corresponding to a Multicast and Broadcast Services (MBS) session, or information corresponding to the tunnel which has been established, and transmitting, by the network node to the first wireless communication node, a second message including at least one of ID of the MBS session, information corresponding to the tunnel, or acknowledgement indication.

In some aspects, the method includes removing, by the network node, from an RAN list, the RAN ID of the first wireless communication node.

In some aspects, the method includes determining, by the network node, that the RAN list is empty, and transmitting, by the network node to all of the plurality of wireless communication nodes, a third message to release the tunnel.

In some aspects, the method includes receiving, by the network node from the first wireless communication node, the first message including at least one of a union RAN ID associated with the plurality of wireless communication nodes, an RAN ID of the first wireless communication node, information corresponding to the tunnel which has been established, or indication to reuse the tunnel, wherein the first wireless communication node has received, from a second of the plurality of wireless communication nodes, at least one of information corresponding to a Multicast and Broadcast Services (MBS) session, the information corresponding to the tunnel, or the Union RAN ID, and transmitting, by the network node to the first wireless communication node, a second message including at least one of the information corresponding to the MBS session, the information corresponding to the tunnel, or acknowledgement indication.

In some aspects, the method includes receiving, by the network node from a second wireless communication node which do not belong to the plurality of wireless communication nodes, the first message including at least one of a union RAN ID associated with the second wireless communication node, an RAN ID of the second wireless communication node, or information corresponding to the tunnel which has been established, wherein the second wireless communication node has received, from one of the plurality of wireless communication nodes, at least one of information corresponding to a Multicast and Broadcast Services (MBS) session, the information corresponding to the tunnel, or the Union RAN ID, and transmitting, by the network node to the first wireless communication node, a second message including at least one of the information corresponding to the MBS session, the information corresponding to the tunnel, or acknowledgement indication.

In some aspects, the method includes receiving, by the network node from the first wireless communication node, the first message including at least one of a union RAN ID associated with the plurality of wireless communication nodes, an RAN ID of the first wireless communication node, or information corresponding to the tunnel which has been established, wherein the first wireless communication node has received, from a second of the plurality of wireless communication nodes, at least one of information corresponding to a Multicast and Broadcast Services (MBS) session, the information corresponding to the tunnel, or the Union RAN ID, determining, by the network node, that the tunnel is not available for the first wireless communication node, establishing, by the network node, a new tunnel based on the information corresponding to the MBS session, and transmitting, by the network node to the first wireless communication node, a second message including at least one of the information corresponding to the MBS session, or information corresponding to the new tunnel.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:

receiving, by a network node from a first one of a plurality of wireless communication nodes, a first message comprising at least a random access node identification (RAN ID) of the first one of the plurality of wireless communication nodes, the first message related to a tunnel configured to be shared by the plurality of wireless communication nodes;

wherein the plurality of wireless communication nodes share a same Centralized Unit-User Plane (CU-UP), wherein the plurality of wireless communication nodes are associated with a Union Random Access Node Identification (Union RAN ID), receiving, by the network node from the first wireless communication node, the first message further comprising at least one of: the Union RAN ID or information corresponding to a Multicast and Broadcast Services (MBS) session;

determining, by the network node, whether the tunnel satisfies the information corresponding to the MBS session;

in response to determining that the tunnel satisfies the information corresponding to the MBS session, adding, by the network node, the RAN ID of the first wireless communication node into an RAN list associated with the MBS session or the tunnel; and transmitting, by the network node to the first wireless communication node, a second message comprising at least one of: the information corresponding to the MBS session or information corresponding to the tunnel.

2. The wireless communication method of claim 1, further comprising:

in response to determining that the tunnel does not satisfy the information corresponding to the MBS session, establishing, by the network node, the tunnel for the MBS session; and transmitting, by the network node to the first wireless communication node, a second message comprising at least one of: the information corresponding to the MBS session or information corresponding to the tunnel.

3. The wireless communication method of claim 1, wherein the wireless communication node maintains an RAN list that comprises a global RAN ID shared by the plurality of wireless communication nodes, or a plurality of specific RAN IDs respectively associated with the plurality of wireless communication nodes.

4. The wireless communication method of claim 3, further comprising:

receiving, by the network node from the first wireless communication node, the first message comprising at least one of: the specific RAN ID of the first wireless communication node, or information corresponding to a Multicast and Broadcast Services (MBS) session; and determining, by the network node, whether the tunnel satisfies the information corresponding to the MBS session.

5. The wireless communication method of claim 4, further comprising:

in response to determining that the tunnel satisfies the information corresponding to the MBS session, adding, by the network node, the specific RAN ID of the first wireless communication node into the RAN list; and transmitting, by the network node to the first wireless communication node, a second message comprising at least one of: the information corresponding to the MBS session or information corresponding to the tunnel.

6. The wireless communication method of claim 4, further comprising:

in response to determining that the tunnel does not satisfy the information corresponding to the MBS session, establishing, by the network node, the tunnel for the MBS session; and transmitting, by the network node to the first wireless communication node, a second message comprising at least one of: the information corresponding to the MBS session or information corresponding to the tunnel.

7. The wireless communication method of claim 6, further comprising:

adding, by the network node, the specific RAN ID of the first wireless communication node into the RAN list.

8. The wireless communication method of claim 1, further comprising:

receiving, by the network node from the first wireless communication node, the first message further comprising at least one of: information corresponding to a Multicast and Broadcast Services (MBS) session or information corresponding to the tunnel which has been established; and transmitting, by the network node to the first wireless communication node, a second message comprising at least one of: ID of the MBS session, information corresponding to the tunnel, or acknowledgement indication.

9. The wireless communication method of claim 8, further comprising:

removing, by the network node, from an RAN list, the RAN ID of the first wireless communication node.

10. The wireless communication method of claim 9, after removing the RAN ID from the RAN list, further comprising:

determining, by the network node, that the RAN list is empty; and transmitting, by the network node to all of the plurality of wireless communication nodes, a third message to release the tunnel.

11. The wireless communication method of claim 1, further comprising:

receiving, by the network node from the first wireless communication node, the first message further comprising at least one of: a union RAN ID associated with the plurality of wireless communication nodes, information corresponding to the tunnel which has been established, or indication to reuse the tunnel, wherein the first wireless communication node has received, from a second of the plurality of wireless communication nodes, at least one of: information corresponding to a Multicast and Broadcast Services (MBS) session, the information corresponding to the tunnel, or the Union RAN ID; and transmitting, by the network node to the first wireless communication node, a second message comprising at least one of: the information corresponding to the MBS session, the information corresponding to the tunnel, or acknowledgement indication.

12. The wireless communication method of claim 1, further comprising:

receiving, by the network node from a second wireless communication node which does not belong to the plurality of wireless communication nodes, the first message further comprising at least one of: a union RAN ID associated with the second wireless communication node, an RAN ID of the second wireless communication node, or information corresponding to the tunnel which has been established, wherein the second wireless communication node has received, from one of the plurality of wireless communication nodes, at least one of: information corresponding to a Multicast and Broadcast Services (MBS) session, the information corresponding to the tunnel, or the Union RAN ID; and transmitting, by the network node to the first wireless communication node, a second message comprising at least one of: the information corresponding to the MBS session, the information corresponding to the tunnel, or acknowledgement indication.

13. The wireless communication method of claim 1, further comprising:

receiving, by the network node from the first wireless communication node, the first message further comprising at least one of: a union RAN ID associated with the plurality of wireless communication nodes or information corresponding to the tunnel which has been established, wherein the first wireless communication node has received, from a second of the plurality of wireless communication nodes, at least one of: information corresponding to a Multicast and Broadcast Services (MBS) session, the information corresponding to the tunnel, or the Union RAN ID;

determining, by the network node, that the tunnel is not available for the first wireless communication node;

establishing, by the network node, a new tunnel based on the information corresponding to the MBS session; and transmitting, by the network node to the first wireless communication node, a second message comprising at least one of: the information corresponding to the MBS session, or information corresponding to the new tunnel.

14. A wireless communication method, comprising:

sending, by a first one of a plurality of wireless communication nodes, to a network node, a first message comprising at least a random access node identification (RAN ID) of the first one of the plurality of wireless communication nodes, the first message related to a tunnel configured to be shared by the plurality of wireless communication nodes;

wherein the plurality of wireless communication nodes share a same Centralized Unit-User Plane (CU-UP), wherein the plurality of wireless communication nodes are associated with a Union Random Access Node Identification (Union RAN ID), sending, by the first one of the plurality of wireless communication nodes to the network node, the first message further comprising at least one of: the Union RAN ID or information corresponding to a Multicast and Broadcast Services (MBS) session, wherein the network node determines whether the tunnel satisfies the information corresponding to the MBS session, wherein in response to determining that the tunnel satisfies the information corresponding to the MBS session, the network node adds the RAN ID of the first wireless communication node into an RAN list associated with the MBS session or the tunnel; and receiving, by the first one of the plurality of wireless communication nodes from the network node, a second message comprising at least one of: the information corresponding to the MBS session or information corresponding to the tunnel.

15. A wireless communication node, comprising:

at least one processor configured to:

send, via a transmitter to a network node, a first message comprising at least a random access node identification (RAN ID) of a first one of a plurality of wireless communication nodes, the first message related to a tunnel configured to be shared by the plurality of wireless communication nodes;

wherein the plurality of wireless communication nodes share a same Centralized Unit-User Plane (CU-UP), and includes the wireless communication node, wherein the plurality of wireless communication nodes are associated with a Union Random Access Node Identification (Union RAN ID), send, via the transmitter to the network node, the first message further comprising at least one of: the Union RAN ID or information corresponding to a Multicast and Broadcast Services (MBS) session, wherein the network node determines whether the tunnel satisfies the information corresponding to the MBS session, wherein in response to determining that the tunnel satisfies the information corresponding to the MBS session, the network node adds the RAN ID of the first wireless communication node into an RAN list associated with the MBS session or the tunnel; and receive, via a receiver from the network node, a second message comprising at least one of: the information corresponding to the MBS session or information corresponding to the tunnel.

16. A network node, comprising:

at least one processor configured to:

receive, via a receiver from a first one of a plurality of wireless communication nodes, a first message comprising at least a random access node identification (RAN ID) of the first one of the plurality of wireless communication nodes, the first message related to a tunnel configured to be shared by the plurality of wireless communication nodes;

wherein the plurality of wireless communication nodes share a same Centralized Unit-User Plane (CU-UP), wherein the plurality of wireless communication nodes are associated with a Union Random Access Node Identification (Union RAN ID), receive, via the receiver from the first one of the plurality of wireless communication nodes, the first message further comprising at least one of: the Union RAN ID or information corresponding to a Multicast and Broadcast Services (MBS) session;

determine whether the tunnel satisfies the information corresponding to the MBS session;

in response to determining that the tunnel satisfies the information corresponding to the MBS session, add the RAN ID of the first wireless communication node into an RAN list associated with the MBS session or the tunnel; and transmit, via a transmitter to the first one of the plurality of wireless communication nodes, a second message comprising at least one of: the information corresponding to the MBS session or information corresponding to the tunnel.

* * * * *